(12) United States Patent
Bryant et al.

(10) Patent No.: US 8,380,762 B2
(45) Date of Patent: Feb. 19, 2013

(54) DATABASE APPLICATION INCLUDING SPILT VIEWS

(75) Inventors: Christopher Bryant, Seattle, WA (US); George R. Fordham, Seattle, WA (US); Marcus Markiewicz, Mercer Island, WA (US); Michael McCormack, Snohomish, WA (US); Theresa Naramore, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/796,116

(22) Filed: Jun. 8, 2010

(65) Prior Publication Data
US 2010/0241672 A1    Sep. 23, 2010

Related U.S. Application Data

(63) Continuation of application No. 11/159,763, filed on Jun. 23, 2005, now Pat. No. 7,734,664.

(51) Int. Cl.
*G06F 17/30* (2006.01)

(52) U.S. Cl. ........................................................ 707/805

(58) Field of Classification Search .................. 707/805, 707/999.1, 999.102; 715/764
See application file for complete search history.

(56) References Cited

U.S. PATENT DOCUMENTS

| | | | |
|---|---|---|---|
| 7,426,059 B2 | 9/2008 | Broda et al. | 358/1.3 |
| 7,734,664 B2 | 6/2010 | Bryant et al. | 707/805 |
| 2002/0054105 A1* | 5/2002 | Breuer et al. | 345/764 |
| 2002/0063734 A1* | 5/2002 | Khalfay et al. | 345/744 |
| 2003/0169446 A1* | 9/2003 | Grohs et al. | 358/1.15 |
| 2004/0103369 A1 | 5/2004 | Robertson et al. | 715/509 |
| 2006/0136830 A1 | 6/2006 | Martlage et al. | 715/745 |
| 2008/0043256 A1 | 2/2008 | Broda et al. | 358/1.3 |
| 2008/0046505 A1 | 2/2008 | Netsch et al. | 709/203 |
| 2008/0046506 A1 | 2/2008 | Broda | 709/203 |
| 2008/0046510 A1 | 2/2008 | Beauchamp et al. | 709/204 |
| 2008/0046536 A1 | 2/2008 | Broda | 709/217 |
| 2008/0046556 A1 | 2/2008 | Nicholls et al. | 709/224 |
| 2008/0046568 A1 | 2/2008 | Broda et al. | 709/227 |
| 2008/0046803 A1 | 2/2008 | Beauchamp et al. | 715/212 |
| 2008/0148289 A1 | 6/2008 | Nicholls et al. | 719/318 |
| 2009/0089657 A1 | 4/2009 | Davis | 715/234 |
| 2009/0138790 A1 | 5/2009 | Larcheveque et al. | 715/224 |

OTHER PUBLICATIONS

Roger Jennings, Special Edition Using Microsoft Access 2002, Jun. 21, 2002, Que, Chapters 1, 5, 14, and 15; 33 pages.
U.S. Office Action dated Jul. 31, 2007 cited in U.S. Appl. No. 11/159,763.
U.S. Office Action dated May 30, 2008 cited in U.S. Appl. No. 11/159,763.
U.S. Office Action dated Dec. 1, 2008 cited in U.S. Appl. No. 11/159,763.
U.S. Office Action dated Jun. 19, 2009 cited in U.S. Appl. No. 11/159,763.
U.S. Notice of Allowance dated Jan. 27, 2010 cited in U.S. Appl. No. 11/159,763.

\* cited by examiner

*Primary Examiner* — Syed Hasan
(74) *Attorney, Agent, or Firm* — Merchant & Gould

(57) ABSTRACT

A database application is provided which includes functionality for providing split views. The database application includes an object model having a number of objects, methods, and properties. The object model preferably includes a form object which includes a split view representation. A number of properties are associated with the split view which provides for the presentation of data to a user of the database application.

15 Claims, 7 Drawing Sheets

DATABASE APPLICATION INCLUDING SPILT VIEWS

CROSS REFERENCE TO RELATED APPLICATION

This application is a continuation of application Ser. No. 11/159,763 filed Jun. 23, 2005, now U.S. Pat. No. 7,734,664, which is incorporated herein by reference in its entirety.

BACKGROUND OF THE INVENTION

Current desktop database applications allow a user to manipulate data in a variety of ways. A desktop database application can be used to organize and maintain data associated with the many different applications. For example, a desktop database application may be used for organizing and maintaining a construction project schedule. As another example, a desktop database application may be used for organizing and maintaining personal or business contacts. Additionally, a desktop database application may be used to track inventory orders and shipping dates related to certain inventory. In these instances and others, it is not unusual for a desktop database application to include large amounts of data. Consequently, a user can be overwhelmed and thus frustrated when working with large amounts of data. There are occasions when a user would prefer to view a large amount of data while editing one or more portions of that data. For example, a user may want to view many records on a screen at one time while simultaneously viewing and/or editing details of a single record from the record set. Unfortunately, current desktop database applications do not provide such a mechanism.

It is with respect to these considerations and others that the various embodiments of the present invention have been made.

SUMMARY OF THE INVENTION

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Exemplary embodiments of the present invention provide methods and computer-readable medium for providing a database application having various views. The database application includes an object model having a number of objects which provide programmatic access and implement various views to a user, including split views. In preferred embodiments, the object model includes a form object. The form object preferably includes a number of "visualizations" one of which is a split view, which includes a number of properties and associated settings for presenting data to a user of the database application. The split view can be utilized with any data schema and type.

The database application can be used to create tables, queries, forms, reports, etc. According to a preferred embodiment, the database application is a desktop database application and is operable to provide different split views which enable a user to view and/or modify a variety of data at a given time. According to the preferred embodiments, a user is able view and/or edit multiple records and record details at a time using split views of the database application. A user can configure the split view according to user preference, using a user interface or other programming interface if desired. For example, a user, using the database application, can configure the split view in horizontal and vertical orientations, and simultaneously view data as part of a datasheet and a form.

These and other features and advantages, which characterize the present invention, will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

FIGS. 3A-3B are screen shots from a database application illustrating aspects of the invention.

FIG. 4 is a screen shot from a database application illustrating aspects of the invention.

FIG. 5 is a screen shot from a database application illustrating aspects of the invention.

DETAILED DESCRIPTION OF PREFERRED EMBODIMENTS

Figure 1:
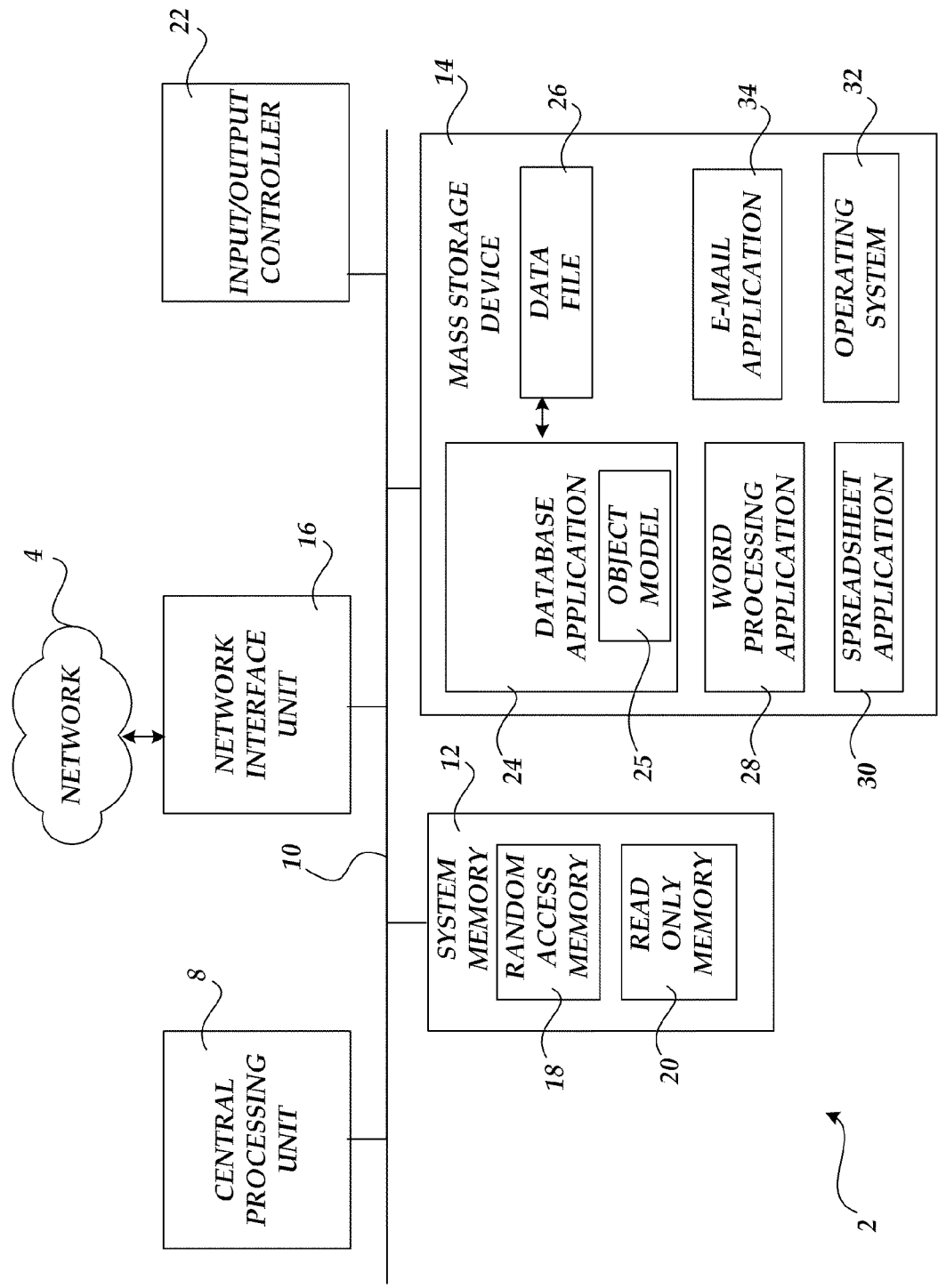
FIG. 1 is a block diagram illustrating an exemplary computing environment for implementation of various embodiments of the present invention.

Exemplary embodiments of the present invention provide methods and computer-readable medium for providing a database application having various views. The database application includes an object model having a number of objects, modes, and properties for providing various views to a user, including split views. In preferred embodiments, the object model includes a form object. The form object preferably includes a number of "visualizations", one of which is a split view which includes a number of properties and associated settings for presenting data to a user of the database application. The split view can be utilized with any data schema and type. A visualization can be described as a way to display data. "Single-record forms" is another visualization which depict one record from the data set at a time. "Continuous forms" is a visualization which show many records at one time in a custom layout. "Datasheets" is another visualization which show many records at a time in a grid.

The database application can be used to create tables, queries, forms, reports, etc. According to preferred embodiments, the database application is operable to provide split views which enable a user to simultaneously view and/or edit multiple records and record details. Using the database application, a user can view and edit a particular record in simultaneous views. A user can configure the split view according to user preference, using a user interface or other programming interface if desired. For example, a user, using the database application, can configure the split view in horizontal and vertical orientations, and adjust the split view according to preference.

Exemplary Operating Environment

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative operating environment for embodiments of the invention will be described. As shown in FIG. 1, computer 2 comprises a general-purpose desktop, laptop, or other type of computer capable of executing one or more application programs. In particular, according to the various embodiments of the invention, the computer 2 is operative to execute a database application 24. As known to those skilled in the art, a database application program 24 provides functionality including, but not limited to, organizing, accessing, and sharing information. According to a preferred embodiment, the database application program includes an object model 25, described in detail below.

According to one preferred embodiment of the invention, a database application 24 comprises the ACCESS database application program, hereby incorporated by reference in its entirety, from MICROSOFT CORPORATION of Redmond, Wash. After using the database application 24, the information may be saved to a data file 26 on the mass storage device 14. Additional details regarding the operation of the ACCESS 2003 application program are publicly available from MICROSOFT CORPORATION of Redmond, Wash. It should be appreciated, however, that the various aspects of the invention described herein may be utilized with other database applications and other related programs from various manufacturers.

FIG. 1 depicts an illustrative computer architecture for a computer 2 utilized in various embodiments of the invention. The computer architecture illustrates a conventional desktop, laptop, or other computer, including a central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules, which will be described in greater detail below.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network or the Internet for example. The computer 2 may connect to the network 4 through a network interface unit 16 connected to the bus 10. It should be appreciated that the network interface unit 16 may also be utilized to connect to other types of networks and remote computer systems. The computer 2 may also include an input/output controller 22 for receiving and processing input from a number of other devices, including a keyboard, mouse, etc. (not shown in FIG. 1). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS XP operating system from MICROSOFT CORPORATION of Redmond, Wash. The mass storage device 14 and RAM 18 may also store one or more program modules. In particular, the mass storage device 14 and the RAM 18 may store a database application program 24, as described above, and other application programs, such as a word processing application 28, a spreadsheet application 30, e-mail application 34, etc. As briefly described above, the database application 24 can comprise an application program for organizing, accessing, and sharing information.

Figure 2:
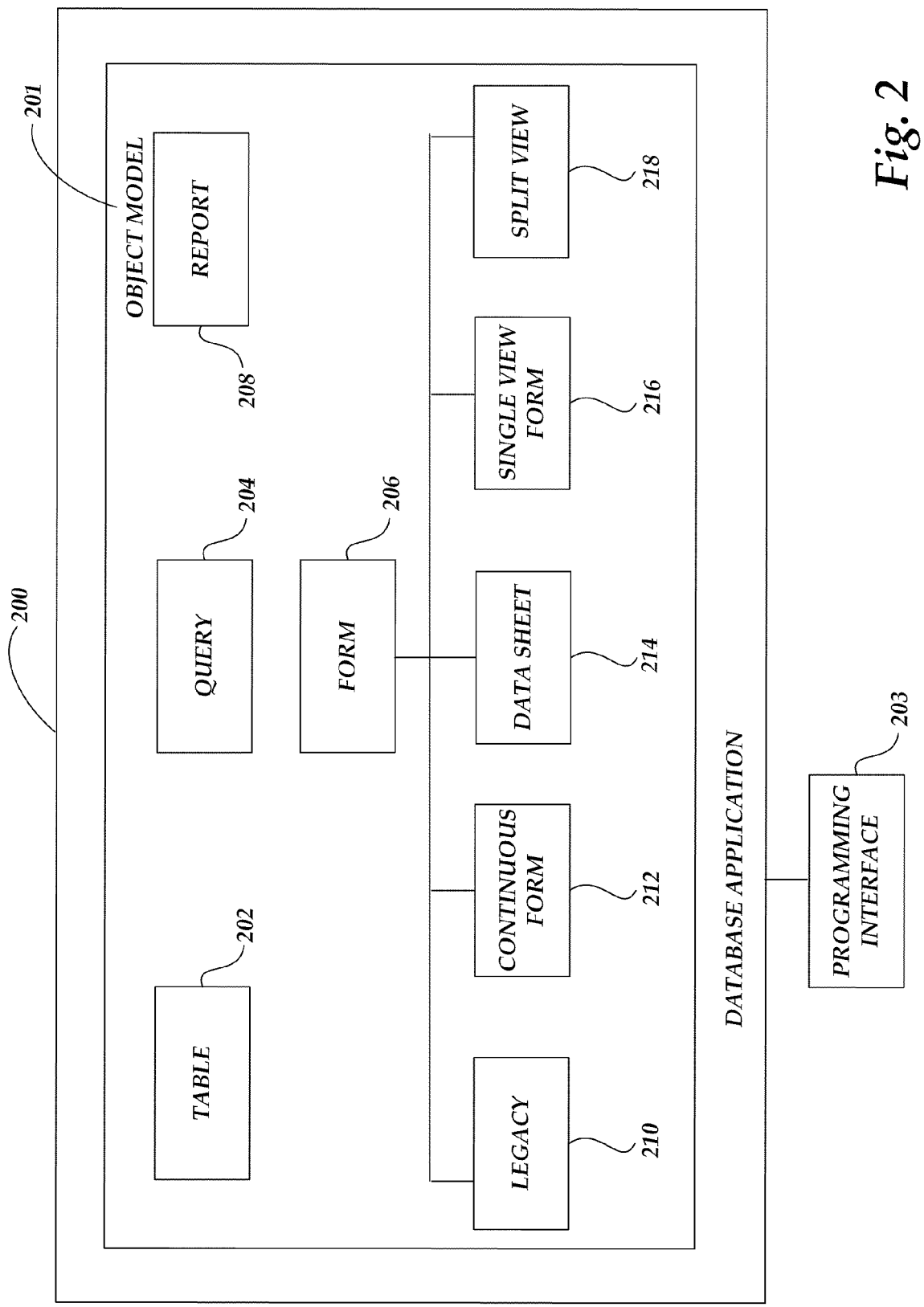
FIG. 2 depicts a block diagram of a database application and associated object model according to an embodiment of the invention.

Referring now to FIG. 2, a block diagram depicts a database application 200 in accordance with an embodiment of the invention. The database application 200 includes an object model 201 that can include a number of different types of objects, as described below. Each object can include one or more methods and/or properties. The methods and properties are used to control and/or provide various functions or features for the database application 200. Furthermore, the methods and properties can be accessed and utilized by a programming interface 203 for further application.

For example, certain object methods and properties can be used to display data, to store and manage data (including data entry and deletion), to provide programming functionality and/or respond to events, such as, but not limited to, data modification like creating new records or changing existing records, or user interaction like moving keyboard or mouse focus from one field to another. Typical events in MICROSOFT ACCESS include BeforeUpdate and AfterUpdate, OnCurrent, OnFormat, OnLoad, OnUnload, etc. A programming application, such as VISUAL BASIC from MICROSOFT CORPORATION, can be used to create, control, and manage the different types of objects, methods, and properties of the database application 200. While the programming interface 203 is shown as a separate application in FIG. 2, it will be appreciated that the programming interface 203 can be implemented as part of the database application 200.

As described above, the database application 200 preferably includes an object model 201. The object model 201 provides an application programming interface 203 for using, creating, and controlling objects, methods, properties, and/or related structure resident in the database application 200. Code can be used to manipulate these features of the database application 200.

In a preferred embodiment, the object model 201 includes, but is not limited to, a table object 202, query object 204, form object 206, and a report object 208. The table object 202, query object 204, form object 206, and the report object 208 each include one or more methods and/or properties. According to this preferred embodiment, the form object 206 includes "visualizations" which provide for viewing and manipulating data, forms, datasheets, and other information when using the database application 200. Preferably, "visualizations" of the form object 206 include, but are not limited to, a design view 210, continuous form view 212, datasheet view 214, single form view 216, and a split view 218.

In one embodiment, the split view 218 preferably contains within it a rendering of a datasheet and a form. A user can select the split view option from a menu, icon, or other application command. For example, the split view can be enabled using a drop-down menu, tool bar, or some other user interface mechanism. A user who enables the split view 218 can simultaneously view and manipulate a form and datasheet when using the database application 200. Once the split view 218 has been enabled, the user can adjustably locate the form and datasheet horizontally or vertically, resizing and manipulating the view according to the user's preference, as described further below.

According to an embodiment of the invention, the object model 201 can be used to display a datasheet above or below a form. Or, the object model 201 can be used to display a datasheet to the right or to the left of a form. As described below, a user, using a user interface of the database application 200, can also utilize a splitter bar provided by the database application 200. The splitter bar operates to delineate a boundary between a datasheet and a form. A user, using a mouse or other input device, can manipulate the splitter bar to adjust the height or width of the form and/or the data sheet. As described below, the split view can also be output to a printer for printing.

The table below illustrates an exemplary object model corresponding to the split view 218. The exemplary object model for the split view 218 includes a number of properties and associated settings for implementing and controlling the split view 218. Each property of the split view 218 preferably includes one or more settings which provide various methods for viewing and manipulating data when using the split view 218 of the database application 200. The exemplary object model can be implemented and manipulated using a programming interface such as VISUAL BASIC, or included as part of the functionality of database application 200.

Each property can be individually set either through the user interface or the object model in order to achieve a specific behavior or look for the split view. For example, in order to turn a single form view into a split form view, you would set the DefaultView property to "Split Form". To further refine the split form, you could select a specific split form orientation (i.e. Split Form Orientation "Datasheet on Bottom"). This would create a form as a split form with the datasheet on bottom. Each of these properties can be set to create the required environment for the developer of the database.

TABLE

| Property Name | Setting | Description |
|---|---|---|
| Default View (DefaultView) | Split Form (5) | Similar to continuous forms, provides a different way to display the form. |
| Split Form Orientation | Datasheet On Top (Default) (0) | When Default View is Split Form, then the datasheet is displayed on top |
|  | Datasheet On Bottom (1) | When Default View is Split Form, then the datasheet is displayed on bottom |
|  | Datasheet on Left (2) | When Default View is Split Form, then the datasheet is displayed on left |
|  | Datasheet on Right (3) | When Default View is Split Form, then the datasheet is displayed on right |
| Split Form Datasheet (SplitFormDatasheet Readonly) | Allow Edits (Default) (0) | The datasheet for the split form allows edits (default) |
|  | Read Only (1) | The datasheet for the split form is read only |
| Split Form Splitter Bar | Yes (Default) (True) | Display the Split Form splitter bar |
|  | No (False) | Don't display the Split Form splitter bar. |
| Split Form Printing (SplitFormPrinting) | Form Only (0) | Sets the default to print a single Form |
|  | Datasheet Only (1) | Sets the default to print the datasheet only using the code of regular datasheet printing |
| Save Splitter Bar Position | Yes (Default) (True) | Splitter bar position persisted |
|  | No (False) | Splitter bar position not persisted. |

As shown in the Table above, the exemplary object model enables the database application 200 to provide various split views to a user. As described above, the split view 218 preferably depends from and is based on the form object 206. The split view 218 can be viewed on a display, such as an LCD or other display device, and also output to an output device, such as a printer. According to this embodiment, the first property of the split view 218 shown in the Table is the "Default View" property. The Default View property can be used to provide a mechanism for enabling the split view, to thereby simultaneously display a form and datasheet to a user when using the database application 200.

Figure 3A:
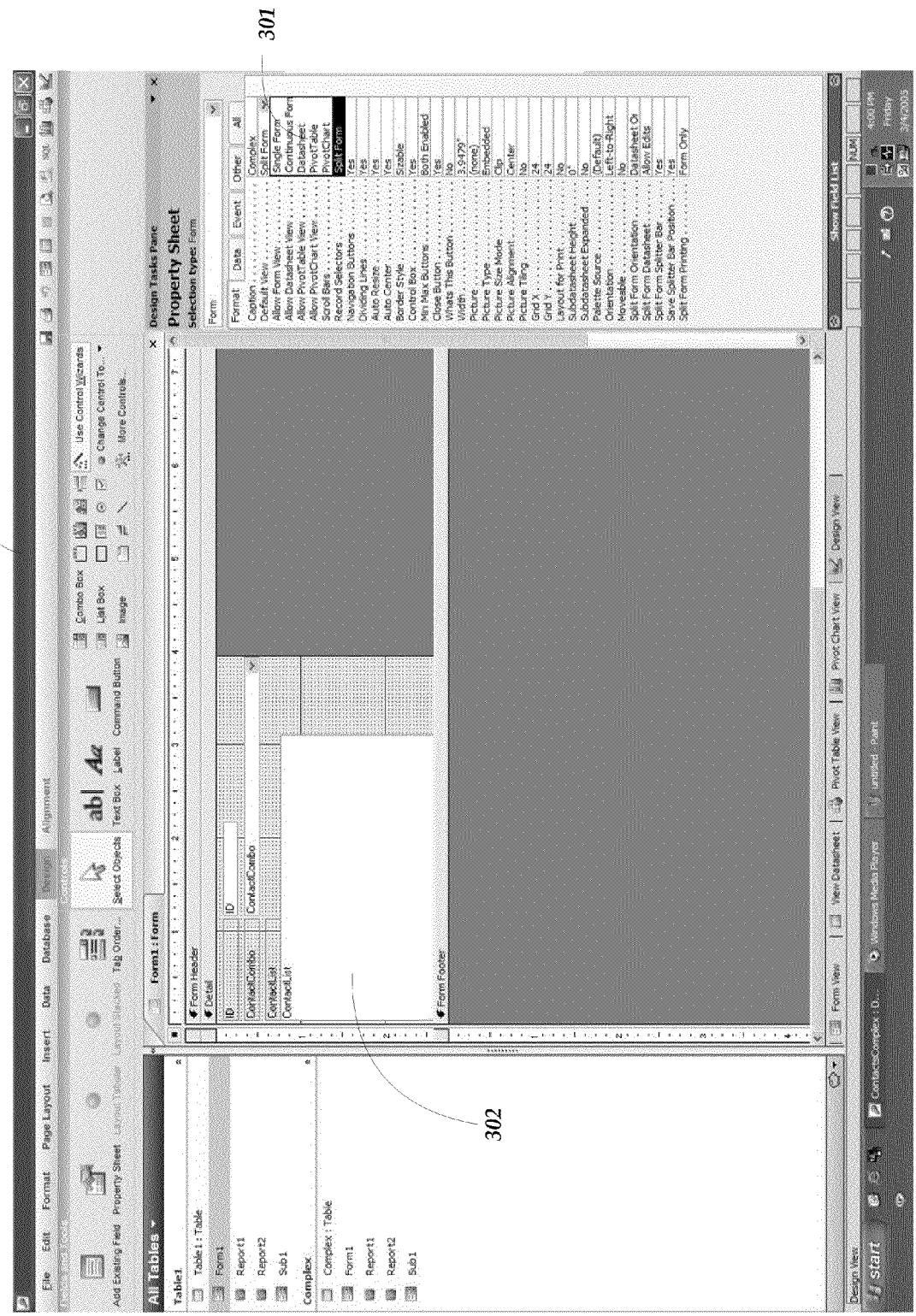

FIG. 3A depicts a database application 300, wherein a user, using the user interface 301, has elected to use a split view to view data. A first viewing area 302 can be used to render a form, according to a particular user selection. Fields can be added to and/or subtracted from the form and/or the datasheet. In design-in-browse mode, the datasheet is a valid drop zone when dragging fields from a field list, and can behave like the regular datasheet automatically populating controls on the form. Preferably, the maximum viewing area that a form can occupy on open (before manual resizing using the splitter bar) is about 80% regardless of form size. Therefore in a 1024×768 screen, the form may be created at a maximum of about 384 pixels high. If the form is larger than that, a scroll bar is preferably rendered. Accordingly, the default minimum size of the datasheet is about 20% of available window viewing area.

Figure 3B:
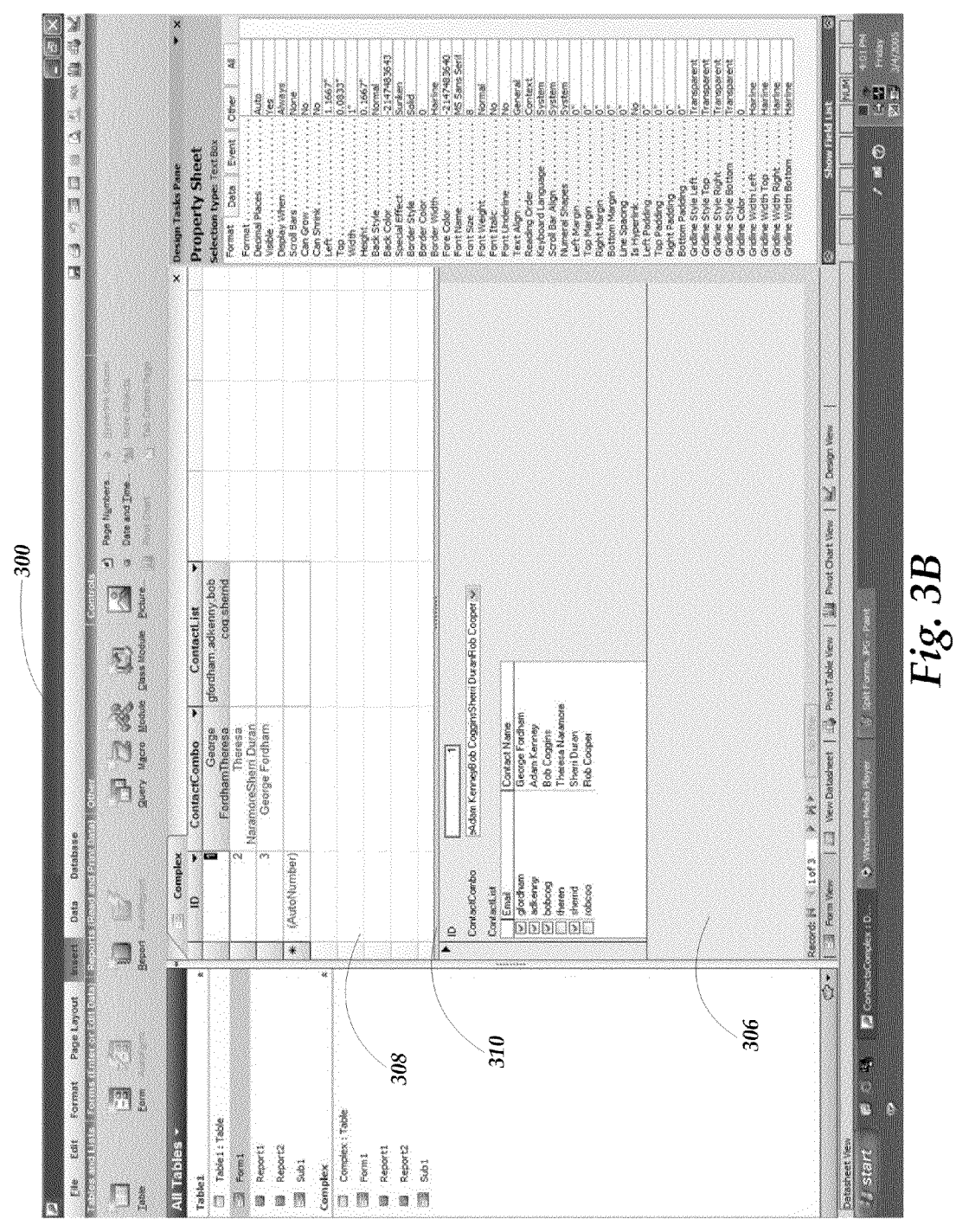

As shown in FIG. 3B, a user is viewing a form 306 and a datasheet 308 while using split views of the database application 300. FIG. 3B depicts a split horizontal view. The dual rendering includes contact information pertaining to a number of contacts. A splitter bar 310 can also be rendered to divide the view, so that the user can adjust the split form 306 and datasheet 308 views. As described below, the splitter bar 310 can be made adjustable, allowing the user to adjust the size of the rendered view. Accordingly, the user, using split views can now view a large number of data entries, while also viewing specific information related to a particular entry.

The second property of the split view 218 is the "Split Form Orientation" property. According to a preferred embodiment, the Split Form Orientation property includes four settings which are available when using the split view 218. The first setting of the Split Form Orientation property is configured to display the datasheet above the form (see the horizontal configuration of FIG. 3B). The second setting of the Split Form Orientation property is configured to display the datasheet below the single form.

Figure 4:
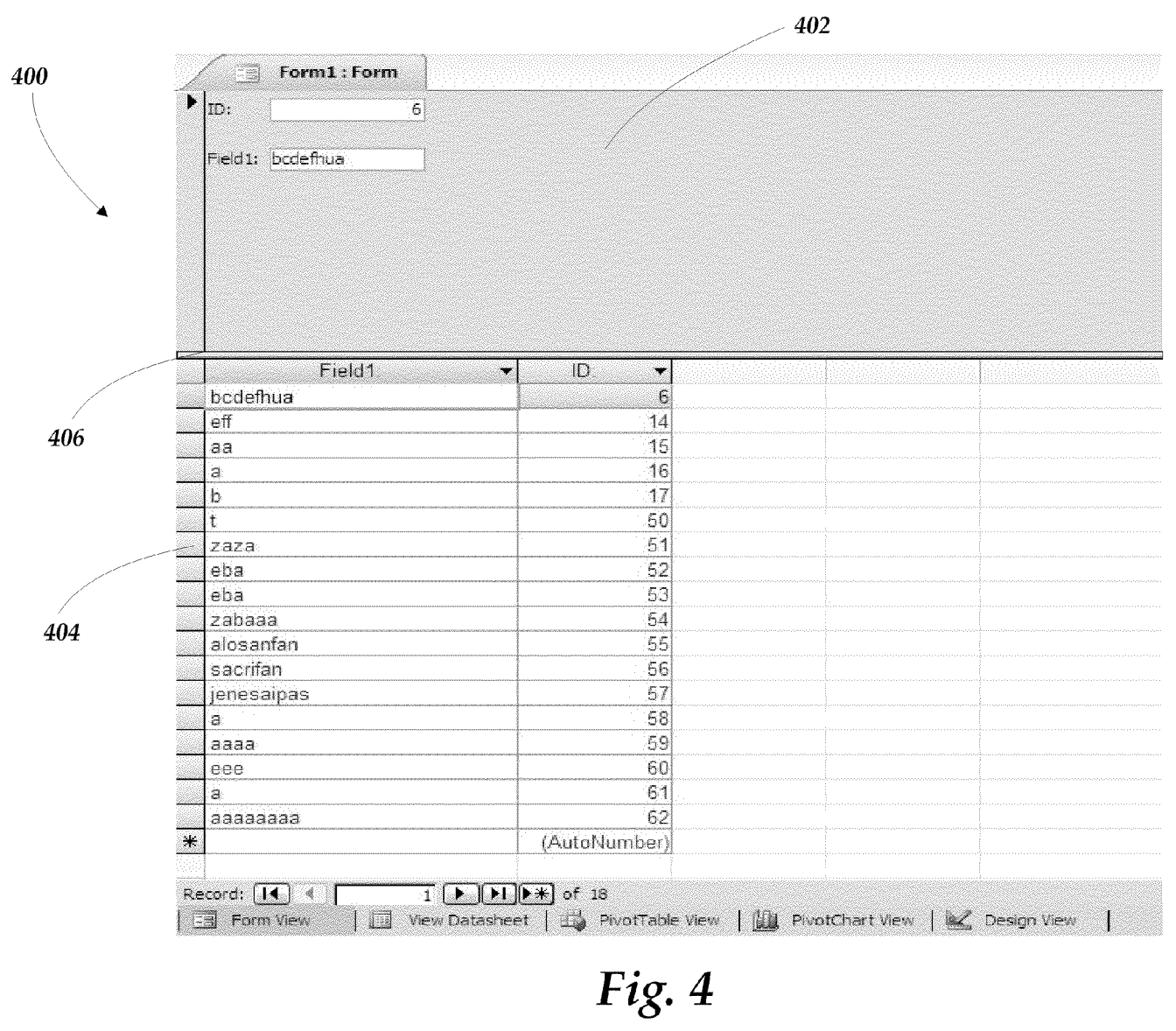
Figure 5:
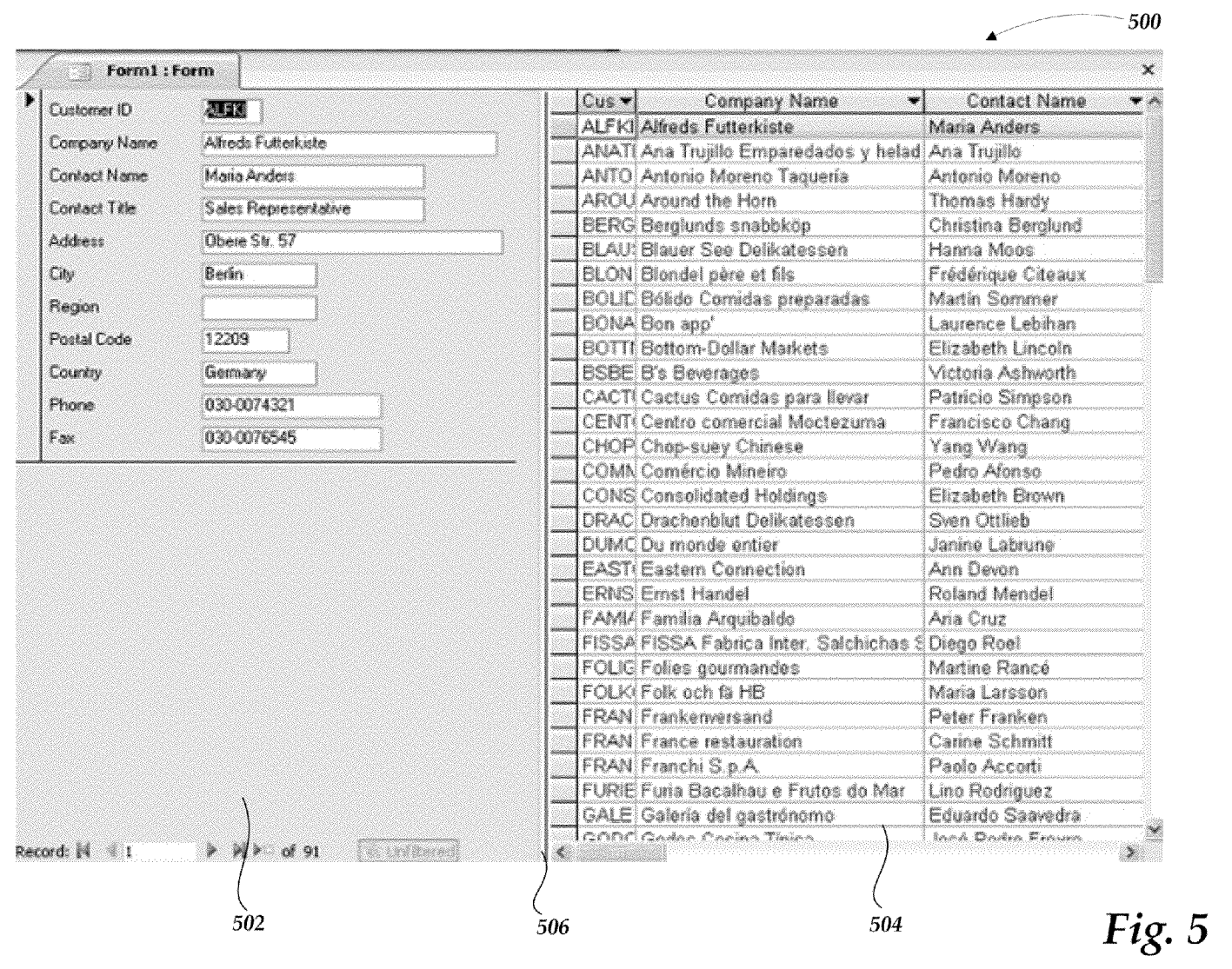

FIG. 4 depicts a split view 400 where an exemplary form 402 has been rendered above an exemplary datasheet 404 in a horizontal configuration. A splitter bar 406 separates the form 402 and datasheet 404 horizontally. The third setting of the Split Form Orientation property is configured to display the datasheet to the left of the form. The fourth setting of the Split Form Orientation property is configured to display the datasheet to the right of the form. FIG. 5 depicts a split view 500 where an exemplary form 502 has been rendered to the left of an exemplary datasheet 504 in a vertical configuration. A splitter bar 506 is shown which vertically delineates a boundary between the form 502 and datasheet 504.

The next property of the split view 218 is the "Split Form Datasheet" property. Preferably, the Split Form Datasheet property has two settings. The first setting of the Split Form Datasheet property is configured to allow edits to be made to the data displayed in the split view 218. The second setting of the Split Form Datasheet property is configured to not allow edits to be made to the data in the datasheet while using the split view 218. For example, when the first setting is implemented, a user can directly edit data of a datasheet. If the second setting is implemented, the datasheet is "read-only", meaning no edits are allowed to the data populating the datasheet.

Continuing to refer to the Table above, the next property is the "Split Form Splitter Bar" property. Preferably, the Split Form Splitter Bar property has two settings. The first setting of the Split Form Splitter Bar property is configured to render a splitter bar between a form and a datasheet when using the split view 218. The second setting of the Split Form Splitter Bar property is configured to not render the splitter bar between a form and a datasheet when using the split view 218. For example, when the first setting is implemented, a splitter bar is rendered in a vertical or horizontal orientation, based on the Split Form Orientation property setting. The objective of this property is to allow or disallow user resizing of the split forms.

The next property in the Table is the "Split Form Printing" property. According to a preferred embodiment, the Split Form Printing property has two settings. The first setting of the Split Form Printing property is configured to print a single form when using the split view 218. The second setting of the Split Form Printing property is configured to print the datasheet only. For example, when the first setting is implemented, the user is able to print a particular form that has been rendered when using the split view 218. When the second setting is implemented, the user is able to print a particular datasheet that has been rendered when using the split view 218.

Figure 6:
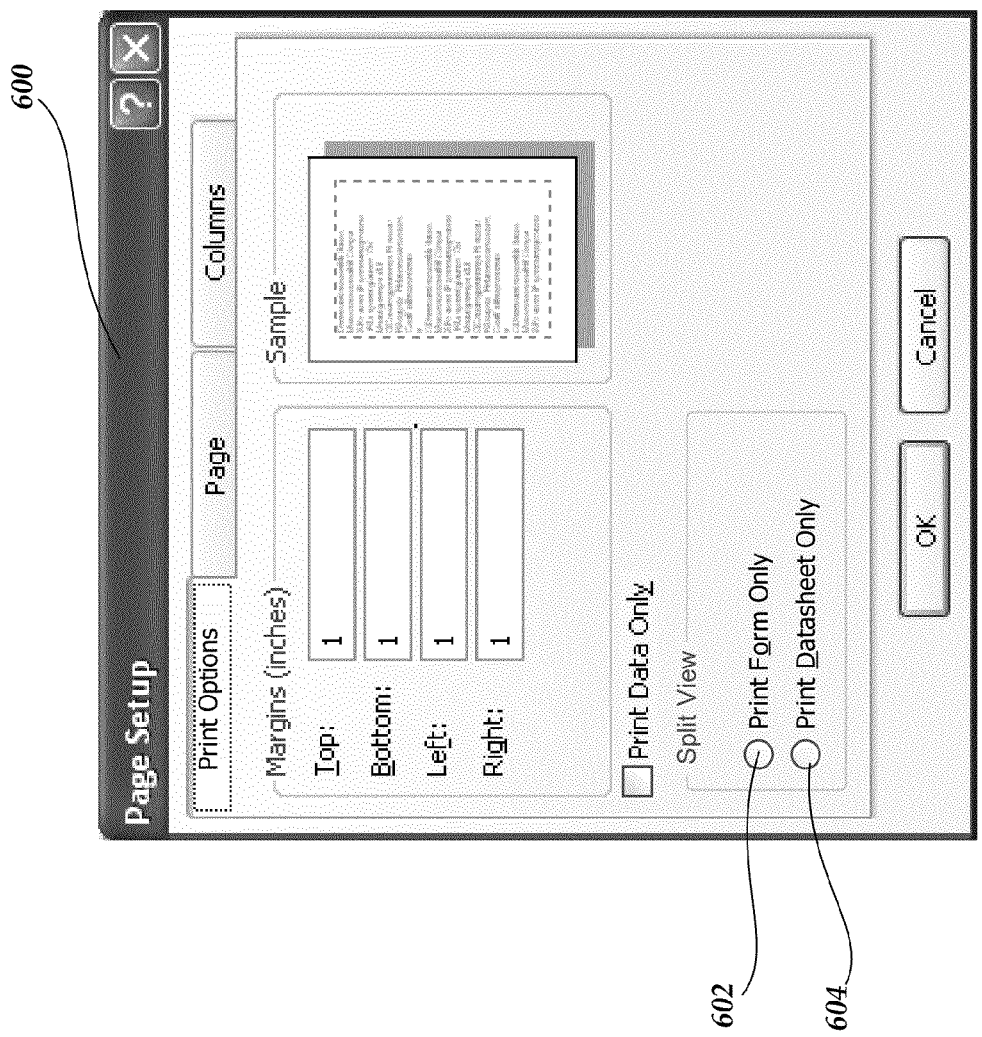
FIG. 6 is a screen shot from a database application illustrating aspects of the invention.

FIG. 6 depicts a page setup window 600. The database application, such as database application 200, renders the page setup window 600 when a user selects a print option using the user interface when using the split view 218. As shown in FIG. 6, the page setup window 600 includes a first radio button 602 which is associated with form printing. A user can select the first radio button 602 when desirous of a printed form. The page setup window 600 includes a second radio button 604 associated with datasheet printing. A user can select the second radio button 604 when desirous of a printed datasheet. Preferably, these options are available when viewing a split view.

The next property "Save Splitter Bar Position" preferably has two settings which allow the position of the splitter bar to be persisted or not. Thus, using this property, a user can save the splitter bar location, so that the next time the user is using the split view 218, the splitter bar will be automatically rendered at the previously saved location. Preferably, the splitter bar can be used to adjust the size of the form, not the datasheet. Thus, when the size of the form is reduced, more rows are shown than were previously shown on the datasheet for example. It is also preferred that the top row visible is anchored to the top of the window it occupies, either the splitter bar or the window during resize. When the form is enlarged, fewer rows are shown than were previously shown on the datasheet. The splitter bar may be used to resize the datasheet space to relative non-existence.

Using the foregoing properties of the split view 218, a user or another application can implement split views when using database application 200. Furthermore, the properties can be used to provide programmatic access for developing code to further utilize aspects of the database application 200. It will be appreciated that the database application 200 can be implemented such that an object model is mapped to the user interface which includes features for allowing a user of the database application 200 to implement the split view 218. Moreover, the properties of the split view may be set in design mode using code or a property sheet. The property sheet allows mapping functionality for setting various behaviors of objects, etc. Using the user interface, a user can control how the form and datasheet will be displayed when using the split view 218. The user can also rearrange the view while in split view 218. Thus, when a user wishes to view data using split views, the database application 200 can enable the selected view through a property sheet, automatically or upon user input.

According to a preferred embodiment of the invention, when the split view is implemented, a user can use the interface for multi-select operations. Moreover, a selected item in a datasheet can be used to determine what is shown in the associated form. In the case of multi-select, preferably there will be a "selected record" for either multi-selecting rows or columns. It is also preferred that the form and the datasheet are in synchronization with respect to one another, meaning that at all times the primary selection in the datasheet is rendered in the form view. Additionally the record displayed in the form view will be selected in the datasheet. Therefore, regardless of what mechanism an end user navigates with, the recordset and cursor are in the same place. This goes beyond simple record level navigation and the cell focus is also reflected in selection. Filter and sort properties preferably apply to both the datasheet and form when the split view is implemented. The user interface can implement the split view from a drop-down menu, button, macro, or other user interface selectable by a keyboard, mouse, stylus, or other pointing or selecting interface. It will be appreciated that the particular interface for availing the split view can be designed and/or implemented in a variety of ways, and the invention is not intended to limited to any particular embodiments or examples discussed herein.

It will be appreciated that objects associated with a database application and the view that the user chooses can be determined by the user to address the specific data task that they are trying to accomplish. Whether this means to allow for data entry, display single pieces of information, or to display and edit complex pieces of data in multiple views to make it easier to read and understood by the end user, etc. For example, setting some available properties on the same form can enforce a data integrity rule requiring all addresses to have a state associated therewith. As another example, if a user wants to update addresses in his/her customer list, the user might create one particular type of view (like a single-record form). If the user wanted to see a full list of all customers, another view might be more appropriate (like a datasheet). The split view allows for a combination of both single-record forms and datasheets.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for presenting data of a database application, the method comprising:
    providing an application programming interface, the application programming interface comprising one or more methods for displaying a split view form, the split view form having one or more visualizations for viewing and manipulating data in the database application, the application programming interface providing for using, creating, and controlling a plurality of objects and properties, and the split view form associated with data of the database application;
    mapping the split view form to a user interface rendering a split view;
    presenting in the user interface rendering the split view a properties setting interface for setting properties mapping functionality for setting behavior associated with the split view;
    setting properties mapping functionality for setting behavior associated with the split view to control a visual rendering of the split view on a display device, wherein the split view further includes at least a first view and a second view, wherein the first view is a visual layout view and the second view is a datasheet view of the underlying data for the visual layout view;
    synchronizing the visual layout view with the underlying data of the datasheet view; and
    simultaneously displaying the datasheet view and the visual layout view synchronized with the underlying data of the datasheet view.

2. The method of claim 1, wherein the setting properties mapping functionality for setting behavior associated with the split view further comprises:
    configuring a first property to control the orientation of the split view;
    configuring a second property to control a presentation order for the rendering; and
    configuring a third property with a control for automatically selecting whether to print the visual layout view or the datasheet view.

3. The method of claim 1, wherein the setting properties mapping functionality for setting behavior associated with the split view further comprises configuring a property to allow edits to the datasheet view based on an associated edit setting.

4. The method of claim 1, wherein the setting properties mapping functionality for setting behavior associated with the split view further comprises configuring a property for delineating a boundary between a layout view and the datasheet view based on an associated setting.

5. The method of claim 1, wherein the setting properties mapping functionality for setting behavior associated with the split view further comprises configuring a property for selecting print capabilities for printing when using the split view.

6. A method for presenting data of a database application, the method comprising:
    providing an application programming interface, the application programming interface for using, creating, and controlling a plurality of objects and properties, the application programming interface for displaying a split view form, the split view form having one or more visualizations for viewing and manipulating data in the database application;
    mapping the split view form to a user interface rendering a split view;
    presenting, in the user interface rendering the split view, a properties setting interface for setting properties mapping functionality for setting behavior associated with the split view;
    setting properties mapping functionality for setting behavior associated with the split view to control a visual rendering of the split view on a display device, wherein the split view further includes at least a first view and a second view, wherein the first view is a visual layout view and the second view is a datasheet view of the underlying data for the visual layout view;
    synchronizing the visual layout view with the underlying data of the datasheet view; and
    simultaneously displaying the datasheet view and the visual layout view synchronized with the underlying data of the datasheet view in the rendered split view.

7. The method of claim 6, wherein the setting properties mapping functionality for setting behavior associated with the split view further comprises:
    configuring a first property to control the orientation of the split view;
    configuring a second property to control a presentation order for the rendering; and
    configuring a third property with a control for automatically selecting whether to print the visual layout view or the datasheet view.

8. The method of claim 6, wherein the setting properties mapping functionality for setting behavior associated with the split view further comprises configuring a property to allow edits to the datasheet view based on an associated edit setting.

9. The method of claim 6, wherein the setting properties mapping functionality for setting behavior associated with the split view further comprises configuring a property for delineating a boundary between a layout view and the datasheet view based on an associated setting.

10. The method of claim 6, wherein the setting properties mapping functionality for setting behavior associated with the split view further comprises configuring a property for selecting print capabilities for printing when using the split view.

11. A system for presenting data of a database application, comprising:
 a storage device for storing data in a database application;
 an application programming interface, the application programming interface having one or more methods for rendering a split view form, the split view form having one or more visualizations for viewing and manipulating data in the database application, the application programming interface providing for using, creating, and controlling a plurality of objects and properties and the split view form;
 a processor, coupled to the storage device, the processor mapping the split view form to a user interface rendering a split view, presenting in the user interface rendering the split view a properties setting interface for setting properties mapping functionality for setting behavior associated with the split view, receiving property settings for setting behavior associated with the split view to control a visual rendering of the split view on a display device, wherein the split view further includes at least a first view and a second view, wherein the first view is a visual layout view and the second view is a datasheet view of the underlying data for the visual layout view, the processor synchronizing the visual layout view with the underlying data of the datasheet view and simultaneously displaying the datasheet view and the visual layout view synchronized with the underlying data of the datasheet view in the rendered split view.

12. The system of claim 11, wherein the processor configures a first property to control the orientation of the split view, configures a second property to control a presentation order for the rendering and configures a third property with a control for automatically selecting whether to print the visual layout view or the datasheet view.

13. The system of claim 11, wherein the processor configures a property to allow edits to the datasheet view based on an associated edit setting.

14. The system of claim 11, wherein the processor configures a property for delineating a boundary between a layout view and the datasheet view based on an associated setting.

15. The system of claim 11, wherein the processor configures a property for selecting print capabilities for printing when using the split view.

* * * * *